(12) United States Patent
Cho et al.

(10) Patent No.: US 9,482,320 B2
(45) Date of Patent: Nov. 1, 2016

(54) PLANETARY GEAR TRAIN OF AUTOMATIC TRANSMISSION FOR VEHICLES

(71) Applicant: Hyundai Motor Company, Seoul (KR)

(72) Inventors: Wonmin Cho, Hwaseong-si (KR); Jae Chang Kook, Hwaseong-si (KR); Myeong Hoon Noh, Seongnam-si (KR); Seongwook Ji, Ansan-si (KR); Kangsoo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/838,673

(22) Filed: Aug. 28, 2015

(65) Prior Publication Data

US 2016/0169338 A1    Jun. 16, 2016

(30) Foreign Application Priority Data

Dec. 11, 2014    (KR) .......................... 10-2014-0178387

(51) Int. Cl.
*F16H 3/66*    (2006.01)

(52) U.S. Cl.
CPC ......... *F16H 3/66* (2013.01); *F16H 2200/0069* (2013.01); *F16H 2200/2012* (2013.01); *F16H 2200/2046* (2013.01)

(58) Field of Classification Search
CPC ............. F16H 3/66; F16H 2200/2046; F16H 2200/0069; F16H 2200/2012
USPC ......................................... 475/275–291, 330
See application file for complete search history.

(56) References Cited

U.S. PATENT DOCUMENTS

| 2012/0231917 | A1 | 9/2012 | Phillips et al. | |
|---|---|---|---|---|
| 2016/0160963 | A1* | 6/2016 | Ji | F16H 3/66 475/277 |
| 2016/0169343 | A1* | 6/2016 | Cho | F16H 3/66 475/275 |
| 2016/0169347 | A1* | 6/2016 | Cho | F16H 3/66 475/277 |

FOREIGN PATENT DOCUMENTS

| JP | 2012-247058 A | 12/2012 |
|---|---|---|
| JP | 2014-35057 A | 2/2014 |
| KR | 10-1448789 B1 | 10/2014 |

\* cited by examiner

*Primary Examiner* — Roger Pang
(74) *Attorney, Agent, or Firm* — Morgan, Lewis & Bockius LLP

(57) ABSTRACT

A planetary gear train of an automatic transmission for vehicles may include an input shaft receiving torque of an engine, an output shaft outputting changed torque, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear, a first rotational shaft, a second rotational shaft, a third rotational shaft, a fourth rotational shaft, a fifth rotational shaft, a sixth rotational shaft, a seventh rotational shaft, an eighth rotational shaft, and six friction elements selectively connecting the rotational shafts and the transmission housing.

18 Claims, 3 Drawing Sheets

FIG. 2

|      | C1 | C2 | C3 | C4 | B1 | B2 | GEAR RATIO |
|------|----|----|----|----|----|----|------------|
| 1ST  |    | O  |    | O  |    | O  | 6.604      |
| 2ND  |    |    | O  | O  |    | O  | 2.954      |
| 3RD  | O  |    |    | O  |    | O  | 1.715      |
| 4TH  | O  |    | O  |    |    | O  | 1.052      |
| 5TH  | O  | O  | O  |    |    |    | 1.000      |
| 6TH  | O  |    | O  |    | O  |    | 0.926      |
| 7TH  | O  |    |    | O  | O  |    | 0.600      |
| 8TH  |    |    | O  | O  | O  |    | 0.486      |
| 9TH  |    | O  |    | O  | O  |    | 0.424      |
| 10TH |    | O  | O  |    | O  |    | 0.356      |
| REV  |    | O  | O  |    |    | O  | 7.736      |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2014-0178387 filed Dec. 11, 2014, the entire contents of which is incorporated herein for all purposes by this reference.

BACKGROUND OF THE INVENTION

1. Field of the Invention

The present invention relates to an automatic transmission for vehicles, and more particularly, to a planetary gear train of an automatic transmission for vehicles that implements a forward 10-speed by a minimum configuration to improve power transmission performance and fuel efficiency.

2. Description of Related Art

In recent years, a rise in oil price causes a rise in competition for technologies to enhance fuel efficiency.

As a result, research into reduction of weight and enhancement of fuel efficiency through down-sizing is being conducted in the case of an engine and research for simultaneously securing operability and fuel efficiency competitiveness through multi-stages is being conducted in the case of an automatic transmission.

However, in the automatic transmission, as a number of transmission stages or speeds increases, the number of internal components increases, and as a result, mountability, transmission efficiency, and the like may still deteriorate and cost, and weight may increase.

Accordingly, development of a planetary gear train which may bring about maximum efficiency with as small a number of components may be important in order to increase a fuel efficiency enhancement effect through the multi-stages.

In this aspect, in recent years, 8 and 9-speed automated transmissions have been implemented and the research and development of a planetary gear train capable of implementing more transmission stages or speeds has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving power delivery performance and fuel efficiency by achieving ten forward speed stages and one reverse speed stage using a driving point positioned at a low engine speed.

According to various aspects of the present invention, a planetary gear train of an automatic transmission for vehicles may include an input shaft receiving torque of an engine, an output shaft outputting changed torque, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear, a first rotational shaft including the first sun gear and selectively connected to a transmission housing, a second rotational shaft including the first planetary carrier and directly connected to the input shaft, a third rotational shaft including the first ring gear, second sun gear, and fourth sun gear, and selectively connected to the transmission housing, a fourth rotational shaft including the second planetary carrier and selectively connected to the first rotational shaft or the second rotational shaft, a fifth rotational shaft including the second ring gear and the third sun gear, a sixth rotational shaft including the third planetary carrier and the fourth ring gear and selectively connected to the fifth rotational shaft, a seventh rotational shaft including the fourth planetary carrier and directly connected to the output shaft, an eighth rotational shaft including the third ring gear and selectively connected to the first rotational shaft, and six friction elements selectively connecting the rotational shafts and the transmission housing.

Each of the first, second, third, and fourth planetary gear sets may comprise a single pinion planetary gear set.

The first, second, third, and fourth planetary gear sets may be sequentially disposed from an engine side.

Each of the sixth friction elements may include a first clutch interposed between the second rotational shaft and the fourth rotational shaft, a second clutch interposed between the first rotational shaft and the fourth rotational shaft, a third clutch interposed between the fifth rotational shaft and the sixth rotational shaft, a fourth clutch interposed between the first rotational shaft and the eighth rotational shaft, a first brake interposed between the third rotational shaft and the transmission housing, and a second brake interposed between the first rotational shaft and the transmission housing.

Transmission speeds implemented by selectively operating the six friction elements may include a first forward transmission speed implemented by simultaneously operating the second and fourth clutches and the second brake, a second forward transmission speed implemented by simultaneously operating the third and fourth clutches and the second brake, a third forward transmission speed implemented by simultaneously operating the first and fourth clutches and the second brake, a fourth forward transmission speed implemented by simultaneously operating the first and third clutches and the second brake, a fifth forward transmission speed implemented by simultaneously operating the first, second, and third clutches, a sixth forward transmission speed implemented by simultaneously operating the first and third clutches and the first brake, a seventh forward transmission speed implemented by simultaneously operating the first and fourth clutches and the first brake, an eighth forward transmission speed implemented by simultaneously operating the third and fourth clutches and the first brake, a ninth forward transmission speed implemented by simultaneously operating the second and fourth clutches and the first brake, a tenth forward transmission speed implemented by simultaneously operating the second and third clutches and the first brake, and a reverse transmission speed implemented by simultaneously operating the second and third clutches and the second brake.

According to various aspects of the present invention, a planetary gear train of an auto transmission for vehicles may include an input shaft receiving torque of an engine, an output shaft outputting changed torque, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear, a first clutch selectively connecting the first planetary carrier and the second planetary carrier, a second clutch selectively connecting the first sun gear and the second planetary carrier, a third clutch selectively connecting the third sun gear and the third planetary carrier, a fourth clutch selectively connecting the first sun gear and the third ring gear, a first brake selectively connecting the first ring gear, the second sun gear and the fourth sun gear to a transmission housing, and a second brake selectively connecting the first sun gear to the transmission housing, in which the input shaft may be directly connected to the first planetary carrier, the output shaft may be directly connected to the fourth planetary carrier, the first ring gear may be directly connected to the second and fourth sun gears, the second ring gear may be directly connected to the third sun gear, and the third planetary carrier may be directly connected to the fourth ring gear.

According to various aspects of the present invention, a planetary gear train of an automatic transmission for vehicles may include an input shaft receiving torque of an engine, an output shaft outputting changed torque, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear, a first rotational shaft including the first sun gear and selectively connected to a transmission housing, a second rotational shaft including the first planetary carrier and directly connected to the input shaft, a third rotational shaft including the first ring gear, second sun gear, and fourth sun gear, and selectively connected to the transmission housing, a fourth rotational shaft including the second planetary carrier and selectively connected to the first rotational shaft or the second rotational shaft, a fifth rotational shaft including the second ring gear and the third sun gear, a sixth rotational shaft including the third planetary carrier and the fourth ring gear, a seventh rotational shaft including the fourth planetary carrier and directly connected to the output shaft, an eighth rotational shaft including the third ring gear and selectively connected to the first rotational shaft or the sixth rotational shaft, and six friction elements selectively connecting the rotational shafts and the transmission housing.

Each of the sixth friction elements may include a first clutch interposed between the second rotational shaft and the fourth rotational shaft, a second clutch interposed between the first rotational shaft and the fourth rotational shaft, a third clutch interposed between the sixth rotational shaft and the eighth rotational shaft, a fourth clutch interposed between the first rotational shaft and the eighth rotational shaft, a first brake interposed between the third rotational shaft and the transmission housing, and a second brake interposed between the first rotational shaft and the transmission housing.

According to various aspects of the present invention, a planetary gear train of an automatic transmission for vehicles may include an input shaft receiving torque of an engine, an output shaft outputting changed torque, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear, a first clutch selectively connecting the first planetary carrier and the second planetary carrier, a second clutch selectively connecting the first sun gear and the second planetary carrier, a third clutch selectively connecting the third ring gear and the third planetary carrier, a fourth clutch selectively connecting the first sun gear and the third ring gear, a first brake selectively connecting the first ring gear, the second sun gear and the fourth sun gear to a transmission housing, and a second brake selectively connecting the first sun gear to the transmission housing, in which the input shaft may be directly connected to the first planetary carrier, the output shaft may be directly connected to the fourth planetary carrier, the first ring gear may be directly connected to the second and fourth sun gears, the second ring gear may be directly connected to the third sun gear, and the third planetary carrier may be directly connected to the fourth ring gear.

Various embodiments of the present invention may achieve ten forward speed stages or speeds by combining four planetary gear sets with six friction elements. Therefore, power delivery performance and fuel efficiency may be improved.

Since a speed stage suitable to engine speed can be achieved due to multiple speed stages, silent driving may be improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each of transmission steps of respective friction elements applied to the exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
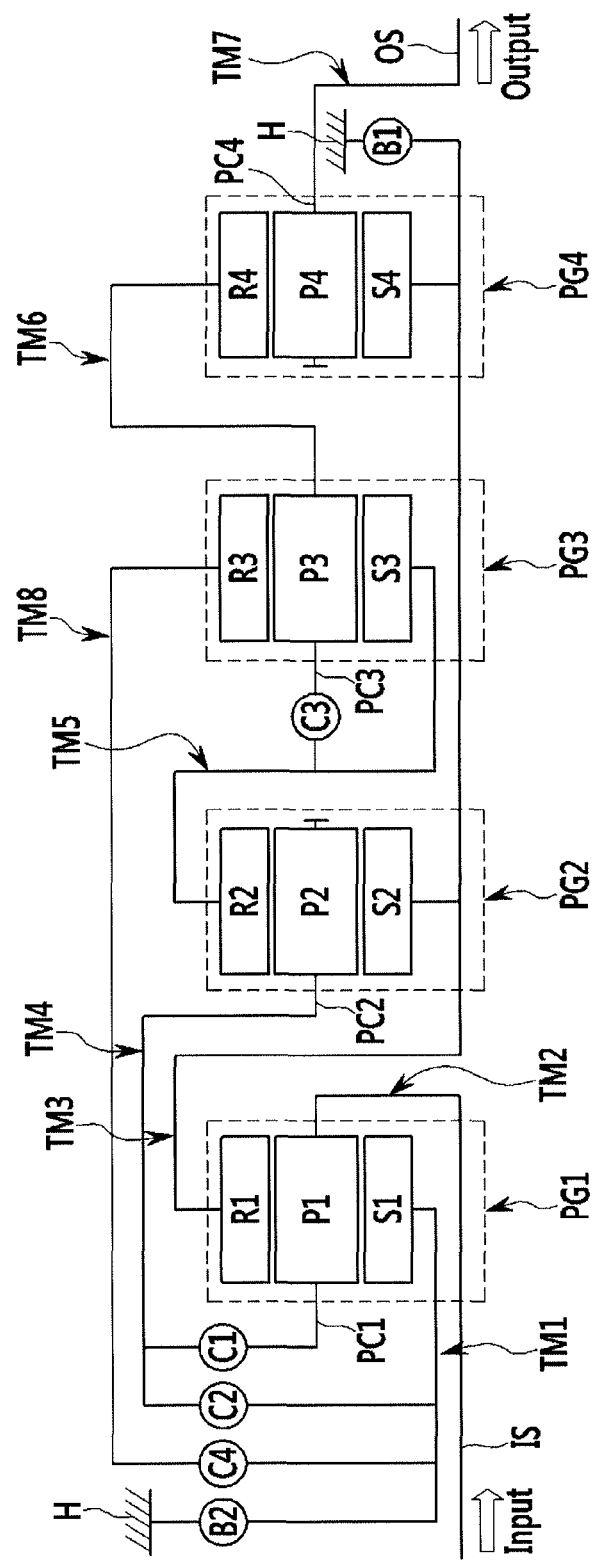
FIG. 1 is a configuration diagram of an exemplary planetary gear train according to the present invention.

FIG. 1 is a configuration diagram of a planetary gear train according to various embodiments of the present invention.

Referring to FIG. 1, a planetary gear train according to various embodiments of the present invention includes first, second, third, fourth planetary gear sets PG1, PG2, PG3, and PG4 disposed on the same axis, and input IS, an output shaft OS, eight rotation shafts TM1 to TM8 including at least one of rotation elements of the first, second, third, and fourth planetary gear sets PG1, PG2, PG3, and PG4, six friction elements C1 to C3 and B1 to B3, and a transmission housing H.

As a result, torque input from the input shaft IS is changed by cooperation of the first, second, third, and fourth planetary gear sets PG1, PG2, PG3, and PG4, and the changed torque is output through the output shaft OS.

In addition, the respective simple planetary gear sets are disposed in the order of the first, second, third, and fourth planetary gear sets PG1, PG2, PG3, and PG4 from an engine side.

The input shaft IS is an input member and power from a crankshaft of an engine is torque-converted through a torque converter to be input into the input shaft IS.

The output shaft OS as an output member is disposed on the same axial line as the input shaft IS to transmit transmitted driving torque to a driving shaft through a differential.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 as rotation elements thereof.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 as rotation elements thereof.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 as rotation elements thereof.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 as a rotation elements thereof.

In the first, second, third, and fourth planetary gear sets PG1, PG2, PG3, and PG4, one or more rotation elements are connected to each other to operate with eight rotation shafts TM1 to TM8.

Herein, one rotation element of the third planetary gear set PG3 and one rotation element of the fourth planetary gear set PG4 are connected each other, and another rotation element of the third planetary gear set PG3 and another rotation element of the fourth planetary gear set PG4 are connected to each other such that the third planetary gear set PG3 and the fourth planetary gear set PG4 are operated as one compound planetary gear set including four rotation elements.

Configurations of the eight rotational shafts TM1 to TM8 will be described below.

The first rotational shaft TM1 includes the first sun gear S1 and is selectively connected to the transmission housing H.

The second rotational shaft TM2 includes the first planetary carrier PC1 and continuously operates as an input element while being directly connected with the input shaft IS.

The third rotational shaft TM3 includes the first ring gear R1, the second sun gear S2, and the fourth sun gear S4, and is selectively connected to the transmission housing H.

The fourth rotational shaft TM4 includes the second planetary carrier PC2 and is selectively connected to the first rotational shaft TM1 and the second rotational shaft TM2.

The fifth rotational shaft TM5 includes the second ring gear R2 and the third sun gear S3.

The sixth rotational shaft TM6 includes the third planetary carrier PC3 and the fourth ring gear R4, and is selectively connected to the fifth rotational shaft TM5.

The seventh rotational shaft TM7 includes the fourth planetary carrier PC4 and is directly connected to the output shaft OS.

The eighth rotational shaft TM8 includes the third ring gear R3 and is selectively connected to the first rotational shaft TM1.

In addition, among the rotational shafts TM1 to TM8, four clutches C1, C2, C3, and C4 which are friction elements are disposed at portions where the rotational shafts are selectively connected to each other.

Further, among the rotational shafts TM1 to TM8, two brakes B1 and B2 which are the friction elements are disposed at portions selectively connected to the transmission housing H.

Layout positions of the six friction elements C1 to C4 and B1 to B2 will be described below.

The first clutch C1 is interposed between the second rotational shaft TM2 and the fourth rotational shaft TM4, and as a result, the second rotational shaft TM2 and the fourth rotational shaft TM4 are selectively integrated with each other.

The second clutch C2 is interposed between the first rotational shaft TM1 and the fourth rotational shaft TM4, and as a result, the first rotational shaft TM1 and the fourth rotational shaft TM4 are selectively integrated with each other.

The third clutch C3 is interposed between the fifth rotational shaft TM5 and the sixth rotational shaft TM6, and as a result, the fifth rotational shaft TM5 and the sixth rotational shaft TM6 are selectively integrated with each other.

The fourth clutch C4 is interposed between the first rotational shaft TM1 and the eighth rotational shaft TM8, and as a result, the first rotational shaft TM1 and the eighth rotational shaft TM8 are selectively integrated with each other.

The first brake B1 is interposed between the third rotational shaft TM3 and the transmission housing H to allow the third rotational shaft TM3 to operate as a selective fixation element.

The second brake B2 is interposed between the first rotational shaft TM1 and the transmission housing H to allow the first rotational shaft TM1 to operate as a selective fixation element.

The respective friction elements including the first, second, third, and fourth clutches C1, C2, C3, and C4 and the first and second brakes B1 and B2 as described above may be configured by multiple-disk hydraulic friction joining units which are friction-joined by hydraulic pressure.

FIG. 2 is an operation table for each of transmission speeds of respective friction elements applied to the planetary gear train according to various embodiments of the present invention.

As shown in FIG. 2, three friction elements are operated at each speed stage in the planetary gear train according to various embodiments of the present invention.

A first forward transmission speed 1ST is implemented by simultaneously operating the second and fourth clutches C2 and C4 and the second brake B2.

A second forward transmission speed 2ND is implemented by simultaneously operating the third and fourth clutches C3 and C4 and the second brake B2.

A third forward transmission speed 3RD is implemented by simultaneously operating the first and fourth clutches C1 and C4 and the second brake B2.

A fourth forward transmission speed 4TH is implemented by simultaneously operating the first and third clutches C1 and C3 and the second brake B2.

A fifth forward transmission speed 5TH is implemented by simultaneously operating the first, second, and third clutches C1, C2, and C3.

A sixth forward transmission speed 6TH is implemented by simultaneously operating the first and third clutches C1 and C3 and the first brake B1.

A seventh forward transmission speed 7TH is implemented by simultaneously operating the first and fourth clutches C1 and C4 and the first brake B1.

A eighth forward transmission speed 8TH is implemented by simultaneously operating the third and fourth clutches C3 and C4 and the first brake B1.

A ninth forward transmission speed 9TH is implemented by simultaneously operating the second and fourth clutches C2 and C4 and the first brake B1.

A tenth forward transmission speed 10TH is implemented by simultaneously operating the second and third clutches C2 and C3 and the first brake B1.

A reverse transmission speed REV is implemented by simultaneously operating the second and third clutches C2 and C3 and the second brake B2.

Shifting processes in the various embodiments of the present invention will be described in further detail.

If the second and fourth clutches C2 and C4 and the second brake B2 are operated at the first forward transmission speed 1ST, the first rotational shaft TM1 is connected to the fourth and eighth rotational shafts TM4 and TM8, rotation speed of the input shaft IS is input to the second rotational shaft TM2, and the first rotational shaft TM1 is operated as the fixed element. Therefore, the first forward transmission speed 1ST is achieved.

If the third and fourth clutches C3 and C4 and the second brake B2 are operated at the second forward transmission speed 2ND, the fifth rotational shaft TM5 is connected to the sixth rotational shaft TM6, the first rotational shaft TM1 is connected to the eighth rotational shaft TM8, rotation speed of the input shaft IS is input to the second rotational shaft TM2, and the first rotational shaft TM1 is operated as the fixed element. Therefore, the second forward transmission speed 2ND is achieved.

If the first and fourth clutches C1 and C4 and the second brake B2 are operated at the third forward transmission speed 3RD, the second rotational shaft TM2 is connected to the fourth rotational shaft TM4, the first rotational shaft TM1 is connected to the eighth rotational shaft TM8, rotation speed of the input shaft IS is input to the second rotational shaft TM2, the first rotational shaft TM1 is operated as the fixed element. Therefore, the third forward transmission speed 3RD is achieved.

If the first and third clutches C1 and C3 and the second brake B2 are operated at the fourth forward transmission speed 4TH, the second rotational shaft TM2 is connected to the fourth rotational shaft TM4, the fifth rotational shaft TM5 is connected to the sixth rotational shaft TM6, rotation speed of the input shaft IS is input to the second rotational shaft TM2, the first rotational shaft TM1 is operated as the fixed element. Therefore, the fourth forward transmission speed 4TH is achieved.

If the first, second, and third clutches C1, C2, and C3 are operated at the fifth forward transmission speed 5TH, the second rotational shaft TM2 is connected to the fourth rotational shaft TM4, the first rotational shaft TM1 is connected to the fourth rotational shaft TM4, and the fifth rotational shaft TM5 is connected to the sixth rotational shaft TM6. Therefore, all planetary gear sets become direct-coupling states. At this state, if rotation speed of the input shaft IS is input to the second rotational shaft TM2, the fifth forward transmission speed 5TH is achieved.

If the first and third clutches C1 and C3 and the first brake B1 are operated at the sixth forward transmission speed 6TH, the second rotational shaft TM2 is connected to the fourth rotational shaft TM4, the fifth rotational shaft TM5 is connected to the sixth rotational shaft TM6, rotation speed of the input shaft IS is input to the second rotational shaft TM2, the third rotational shaft TM3 is operated as the fixed element. Therefore, the sixth forward transmission speed 6TH is achieved.

If the first and fourth clutches C1 and C4 and the first brake B1 are operated at the seventh forward transmission speed 7TH, the second rotational shaft TM2 is connected to the fourth rotational shaft TM4, the first rotational shaft TM1 is connected to the eighth rotational shaft TM8, rotation speed of the input shaft IS is input to the second rotational shaft TM2, the third rotational shaft TM3 is operated as the fixed element. Therefore, the seventh forward transmission speed 7TH is achieved.

If the third and fourth clutches C3 and C4 and the first brake B1 are operated at the eighth forward transmission speed 8TH, the fifth rotational shaft TM5 is connected to the sixth rotational shaft TM6, the first rotational shaft TM1 is connected to the eighth rotational shaft TM8, rotation speed of the input shaft IS is input to the second rotational shaft TM2, the third rotational shaft TM3 is operated as the fixed element. Therefore, the eighth forward transmission speed 8TH is achieved.

If the second and fourth clutches C2 and C4 and the first brake B1 are operated at the ninth forward transmission speed 9TH, the first rotational shaft TM1 is connected to the fourth rotational shaft TM4, the first rotational shaft TM1 is connected to the eighth rotational shaft TM8, rotation speed of the input shaft IS is input to the second rotational shaft TM2, the third rotational shaft TM3 is operated as the fixed element. Therefore, the ninth forward transmission speed 9TH is achieved.

If the second and third clutches C2 and C3 and the first brake B1 are operated at the tenth forward transmission speed 10TH, the first rotational shaft TM1 is connected to the fourth rotational shaft TM4, the fifth rotational shaft TM5 is connected to the sixth rotational shaft TM6, rotation speed of the input shaft IS is input to the second rotational shaft TM2, the third rotational shaft TM3 is operated as the fixed element. Therefore, the tenth forward transmission speed 10TH is achieved.

If the second and third clutches C2 and C3 and the second brake B2 are operated at the reverse transmission speed REV, the first rotational shaft TM1 is connected to the fourth rotational shaft TM4, the fifth rotational shaft TM5 is connected to the sixth rotational shaft TM6, rotation speed of the input shaft IS is input to the second rotational shaft TM2, the first rotational shaft TM1 is operated as the fixed element. Therefore, the reverse transmission speed REV is achieved.

The planetary gear train according to various embodiments of the present invention may achieve ten forward transmission speeds and one reverse transmission speed by controlling four planetary gear sets PG1, PG2, PG3, and PG4 with three clutches C1, C2, and C3 and three brakes B1, B2, and B3.

Therefore, the planetary gear train according to various embodiments of the present invention may improve power delivery performance and fuel efficiency.

Since a speed stage suitable to engine speed can be achieved due to multiple speed stages, silent driving may be improved.

In addition, since three friction elements operate at each speed stage and the number of non-operating friction elements is minimized, a friction drag loss may be decreased. Therefore, power delivery efficiency and fuel efficiency may be improved.

Figure 3:
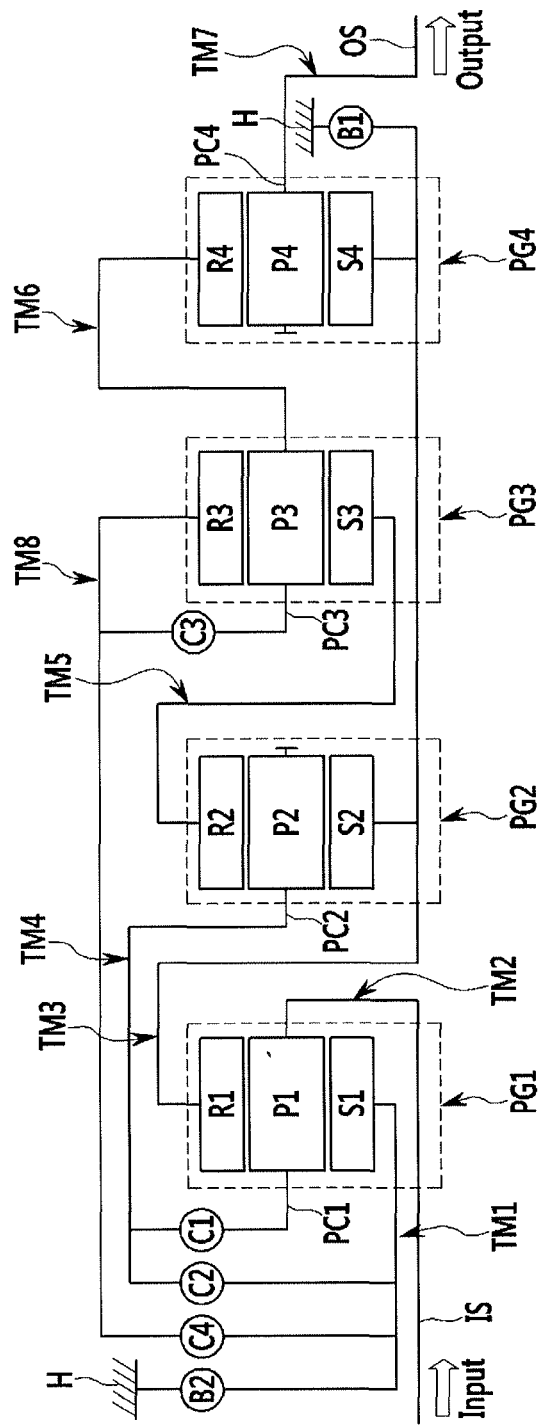
FIG. 3 is a configuration diagram of an exemplary planetary gear train according to the present invention.

FIG. 3 is a configuration diagram of a planetary gear train according to various embodiments of the present invention. Referring to FIG. 3, connection relationships of the third clutch C3 according to various embodiments of the present invention are different from the various embodiments illustrated in FIG. 1.

That is, the third clutch C3 according to the various embodiments of FIG. 3 which makes the third planetary gear set PG3 rotate as a whole is interposed between the sixth rotational shaft TM6 and the eighth rotational shaft TM8 and selectively connects the third planetary carrier PC3 and the third ring gear R3.

Since functions and operation of another the various embodiments of FIG. 3 are the same as those of the various embodiments of FIG. 1, detailed description thereof will be omitted.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for vehicles, comprising:
    an input shaft receiving torque of an engine;
    an output shaft outputting changed torque;
    a first planetary gear set including a first sun gear, a first planetary carrier, and a first ring gear;
    a second planetary gear set including a second sun gear, a second planetary carrier, and a second ring gear;
    a third planetary gear set including a third sun gear, a third planetary carrier, and a third ring gear;
    a fourth planetary gear set including a fourth sun gear, a fourth planetary carrier, and a fourth ring gear;
    a first rotational shaft including the first sun gear and selectively connected to a transmission housing;
    a second rotational shaft including the first planetary carrier and directly connected to the input shaft;
    a third rotational shaft including the first ring gear, second sun gear, and fourth sun gear, and selectively connected to the transmission housing;
    a fourth rotational shaft including the second planetary carrier and selectively connected to the first rotational shaft or the second rotational shaft;
    a fifth rotational shaft including the second ring gear and the third sun gear;
    a sixth rotational shaft including the third planetary carrier and the fourth ring gear and selectively connected to the fifth rotational shaft;
    a seventh rotational shaft including the fourth planetary carrier and directly connected to the output shaft;
    an eighth rotational shaft including the third ring gear and selectively connected to the first rotational shaft; and
    six friction elements selectively connecting the rotational shafts and the transmission housing.

2. The planetary gear train of claim 1, wherein each of the first, second, third, and fourth planetary gear sets comprises a single pinion planetary gear set.

3. The planetary gear train of claim 1, wherein the first, second, third, and fourth planetary gear sets are sequentially disposed from an engine side.

4. The planetary gear train of claim 1, wherein each of the sixth friction elements includes:
    a first clutch interposed between the second rotational shaft and the fourth rotational shaft;
    a second clutch interposed between the first rotational shaft and the fourth rotational shaft;
    a third clutch interposed between the fifth rotational shaft and the sixth rotational shaft;
    a fourth clutch interposed between the first rotational shaft and the eighth rotational shaft;
    a first brake interposed between the third rotational shaft and the transmission housing; and
    a second brake interposed between the first rotational shaft and the transmission housing.

5. The planetary gear train of claim 4, wherein transmission speeds implemented by selectively operating the six friction elements include:
    a first forward transmission speed implemented by simultaneously operating the second and fourth clutches and the second brake;
    a second forward transmission speed implemented by simultaneously operating the third and fourth clutches and the second brake;
    a third forward transmission speed implemented by simultaneously operating the first and fourth clutches and the second brake;

a fourth forward transmission speed implemented by simultaneously operating the first and third clutches and the second brake;
a fifth forward transmission speed implemented by simultaneously operating the first, second, and third clutches;
a sixth forward transmission speed implemented by simultaneously operating the first and third clutches and the first brake;
a seventh forward transmission speed implemented by simultaneously operating the first and fourth clutches and the first brake;
an eighth forward transmission speed implemented by simultaneously operating the third and fourth clutches and the first brake;
a ninth forward transmission speed implemented by simultaneously operating the second and fourth clutches and the first brake;
a tenth forward transmission speed implemented by simultaneously operating the second and third clutches and the first brake; and
a reverse transmission speed implemented by simultaneously operating the second and third clutches and the second brake.

6. A planetary gear train of an auto transmission for vehicles, comprising:
an input shaft receiving torque of an engine, an output shaft outputting changed torque, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear;
a first clutch selectively connecting the first planetary carrier and the second planetary carrier;
a second clutch selectively connecting the first sun gear and the second planetary carrier;
a third clutch selectively connecting the third sun gear and the third planetary carrier;
a fourth clutch selectively connecting the first sun gear and the third ring gear;
a first brake selectively connecting the first ring gear, the second sun gear and the fourth sun gear to a transmission housing; and
a second brake selectively connecting the first sun gear to the transmission housing,
wherein the input shaft is directly connected to the first planetary carrier,
the output shaft is directly connected to the fourth planetary carrier,
the first ring gear is directly connected to the second and fourth sun gears,
the second ring gear is directly connected to the third sun gear, and
the third planetary carrier is directly connected to the fourth ring gear.

7. The planetary gear train of claim 6, wherein each of the first, second, third, and fourth planetary gear sets comprises a single pinion planetary gear set.

8. The planetary gear train of claim 6, wherein the first, second, third, and fourth planetary gear sets are sequentially disposed from an engine side.

9. The planetary gear train of claim 6, wherein transmission speeds implemented by selectively operating the clutches and the brakes include:

a first forward transmission speed implemented by simultaneously operating the second and fourth clutches and the second brake;
a second forward transmission speed implemented by simultaneously operating the third and fourth clutches and the second brake;
a third forward transmission speed implemented by simultaneously operating the first and fourth clutches and the second brake;
a fourth forward transmission speed implemented by simultaneously operating the first and third clutches and the second brake;
a fifth forward transmission speed implemented by simultaneously operating the first, second, and third clutches;
a sixth forward transmission speed implemented by simultaneously operating the first and third clutches and the first brake;
a seventh forward transmission speed implemented by simultaneously operating the first and fourth clutches and the first brake;
an eighth forward transmission speed implemented by simultaneously operating the third and fourth clutches and the first brake;
a ninth forward transmission speed implemented by simultaneously operating the second and fourth clutches and the first brake;
a tenth forward transmission speed implemented by simultaneously operating the second and third clutches and the first brake; and
a reverse transmission speed implemented by simultaneously operating the second and third clutches and the second brake.

10. A planetary gear train of an automatic transmission for vehicles, comprising:
an input shaft receiving torque of an engine;
an output shaft outputting changed torque;
a first planetary gear set including a first sun gear, a first planetary carrier, and a first ring gear;
a second planetary gear set including a second sun gear, a second planetary carrier, and a second ring gear;
a third planetary gear set including a third sun gear, a third planetary carrier, and a third ring gear;
a fourth planetary gear set including a fourth sun gear, a fourth planetary carrier, and a fourth ring gear;
a first rotational shaft including the first sun gear and selectively connected to a transmission housing;
a second rotational shaft including the first planetary carrier and directly connected to the input shaft;
a third rotational shaft including the first ring gear, second sun gear, and fourth sun gear, and selectively connected to the transmission housing;
a fourth rotational shaft including the second planetary carrier and selectively connected to the first rotational shaft or the second rotational shaft;
a fifth rotational shaft including the second ring gear and the third sun gear;
a sixth rotational shaft including the third planetary carrier and the fourth ring gear;
a seventh rotational shaft including the fourth planetary carrier and directly connected to the output shaft;
an eighth rotational shaft including the third ring gear and selectively connected to the first rotational shaft or the sixth rotational shaft; and
six friction elements selectively connecting the rotational shafts and the transmission housing.

11. The planetary gear train of claim 10, wherein each of the first, second, third, and fourth planetary gear sets comprises a single pinion planetary gear set.

12. The planetary gear train of claim 10, wherein the first, second, third, and fourth planetary gear sets are sequentially disposed from an engine side.

13. The planetary gear train of claim 10, wherein each of the sixth friction elements includes:
  a first clutch interposed between the second rotational shaft and the fourth rotational shaft;
  a second clutch interposed between the first rotational shaft and the fourth rotational shaft;
  a third clutch interposed between the sixth rotational shaft and the eighth rotational shaft;
  a fourth clutch interposed between the first rotational shaft and the eighth rotational shaft;
  a first brake interposed between the third rotational shaft and the transmission housing; and
  a second brake interposed between the first rotational shaft and the transmission housing.

14. The planetary gear train of claim 13, wherein transmission speeds implemented by selectively operating the six friction elements include:
  a first forward transmission speed implemented by simultaneously operating the second and fourth clutches and the second brake;
  a second forward transmission speed implemented by simultaneously operating the third and fourth clutches and the second brake;
  a third forward transmission speed implemented by simultaneously operating the first and fourth clutches and the second brake;
  a fourth forward transmission speed implemented by simultaneously operating the first and third clutches and the second brake;
  a fifth forward transmission speed implemented by simultaneously operating the first, second, and third clutches;
  a sixth forward transmission speed implemented by simultaneously operating the first and third clutches and the first brake;
  a seventh forward transmission speed implemented by simultaneously operating the first and fourth clutches and the first brake;
  an eighth forward transmission speed implemented by simultaneously operating the third and fourth clutches and the first brake;
  a ninth forward transmission speed implemented by simultaneously operating the second and fourth clutches and the first brake;
  a tenth forward transmission speed implemented by simultaneously operating the second and third clutches and the first brake; and
  a reverse transmission speed implemented by simultaneously operating the second and third clutches and the second brake.

15. A planetary gear train of an automatic transmission for vehicles, comprising:
  an input shaft receiving torque of an engine, an output shaft outputting changed torque, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear;
  a first clutch selectively connecting the first planetary carrier and the second planetary carrier;
  a second clutch selectively connecting the first sun gear and the second planetary carrier;
  a third clutch selectively connecting the third ring gear and the third planetary carrier;
  a fourth clutch selectively connecting the first sun gear and the third ring gear;
  a first brake selectively connecting the first ring gear, the second sun gear and the fourth sun gear to a transmission housing; and
  a second brake selectively connecting the first sun gear to the transmission housing,
  wherein the input shaft is directly connected to the first planetary carrier,
  the output shaft is directly connected to the fourth planetary carrier,
  the first ring gear is directly connected to the second and fourth sun gears,
  the second ring gear is directly connected to the third sun gear, and
  the third planetary carrier is directly connected to the fourth ring gear.

16. The planetary gear train of claim 15, wherein each of the first, second, third, and fourth planetary gear sets comprises a single pinion planetary gear set.

17. The planetary gear train of claim 15, wherein the first, second, third, and fourth planetary gear sets are sequentially disposed from an engine side.

18. The planetary gear train of claim 15, wherein transmission speeds implemented by selectively operating the clutches and the brakes include:
  a first forward transmission speed implemented by simultaneously operating the second and fourth clutches and the second brake;
  a second forward transmission speed implemented by simultaneously operating the third and fourth clutches and the second brake;
  a third forward transmission speed implemented by simultaneously operating the first and fourth clutches and the second brake;
  a fourth forward transmission speed implemented by simultaneously operating the first and third clutches and the second brake;
  a fifth forward transmission speed implemented by simultaneously operating the first, second, and third clutches;
  a sixth forward transmission speed implemented by simultaneously operating the first and third clutches and the first brake;
  a seventh forward transmission speed implemented by simultaneously operating the first and fourth clutches and the first brake;
  an eighth forward transmission speed implemented by simultaneously operating the third and fourth clutches and the first brake;
  a ninth forward transmission speed implemented by simultaneously operating the second and fourth clutches and the first brake;
  a tenth forward transmission speed implemented by simultaneously operating the second and third clutches and the first brake; and
  a reverse transmission speed implemented by simultaneously operating the second and third clutches and the second brake.

* * * * *